US005178712A

United States Patent [19]

Sakai et al.

[11] Patent Number: 5,178,712

[45] Date of Patent: Jan. 12, 1993

[54] LAMP DEVICE AND METHOD OF BONDING MIRROR REFLECTOR TO LAMP

[75] Inventors: Kenji Sakai; Tsutomu Watanabe, both of Yokosuka, Japan

[73] Assignee: Toshiba Lighting & Technology Corp., Tokyo, Japan

[21] Appl. No.: 588,991

[22] Filed: Sep. 27, 1990

[30] Foreign Application Priority Data

| | | | |
|---|---|---|---|
| Sep. 27, 1989 | [JP] | Japan | 1-251020 |
| Sep. 27, 1989 | [JP] | Japan | 1-251021 |
| Feb. 9, 1990 | [JP] | Japan | 2-30297 |

[51] Int. Cl.[5] .......... B29C 65/59

[52] U.S. Cl. .......... 156/293; 156/305; 264/262

[58] Field of Search .......... 156/305, 293, 294; 264/262; 313/113; 362/226, 296; 427/231

[56] References Cited

U.S. PATENT DOCUMENTS

| | | | |
|---|---|---|---|
| 3,314,331 | 5/1967 | Wiley . | |
| 3,488,543 | 1/1970 | Ridder et al. | 313/113 |
| 4,021,659 | 5/1977 | Wiley | 240/41.36 |
| 4,169,238 | 9/1979 | English et al. | 313/113 |
| 4,482,942 | 11/1984 | Blaisdell et al. | 313/113 |
| 4,608,624 | 8/1986 | Blaisdell et al. | 362/226 |
| 4,785,383 | 11/1988 | Tarney | 313/113 |
| 4,833,576 | 5/1989 | Mers et al. | 313/113 |
| 5,023,031 | 6/1991 | West et al. | 264/262 |

FOREIGN PATENT DOCUMENTS

| | | | |
|---|---|---|---|
| 0061750 | 10/1982 | European Pat. Off. . | |
| 0277659 | 8/1988 | European Pat. Off. . | |
| 0309750 | 4/1989 | European Pat. Off. . | |
| 452751 | 11/1927 | Fed. Rep. of Germany . | |
| 0184750 | 10/1984 | Japan | 264/262 |

*Primary Examiner*—Michael W. Ball
*Assistant Examiner*—Steven D. Maki
*Attorney, Agent, or Firm*—Cushman, Darby & Cushman

[57] ABSTRACT

A lamp device includes a mirror reflector having a cylindrical, hollow lamp mounting portion at a rear end portion of a reflector body having a curved suface, a lamp housed in the mirror reflector and having an end with a sealing portion into which the lamp mounting portion is inserted, and an adhesive, filled between the outer surface of the sealing portion and the inner surface of the lamp mounting portion while the lamp sealing portion is inserted into the lamp mounting portion of the reflector body, for bonding the mirror reflector to the lamp. A space region is formed inside the lamp mounting portion and is surrounded by the inner surface of the lamp mounting portion, the outer surface of the sealing portion, and the adhesive filled therebetween. The end of the space region on the side of the curved surface is open, and the space region prevents heat conduction between the lamp mounting portion and the sealing portion.

5 Claims, 8 Drawing Sheets

LAMP DEVICE AND METHOD OF BONDING MIRROR REFLECTOR TO LAMP

BACKGROUND OF THE INVENTION

1. Field of the Invention

The present invention relates to a lamp device and a method of bonding a mirror reflector to the lamp and, more particularly, to a structure obtained by bonding the mirror reflector and the lamp and a method of injecting an adhesive.

2. Description of the Related Art

A lamp with a mirror reflector is used in a light source unit of a cineprojector, a general projector, or the like.

In order to illuminate articles at shores with beam spots, lamps with mirror reflectors have been used as light sources for so-called "spot down lights".

A lamp with a mirror reflector used in such a field, i.e., a field of article illumination, has an integral structure obtained by bonding the mirror reflector to the lamp.

The reflector comprises a reflector body made of glass or a metal and a dichroic film formed on the inner surface of the reflector body.

The reflector body has a reflector axis and a curved surface. The curved surface is, for example, a surface of second degree having the reflector axis as its center of revolution. The surface of the second degree is, for example, an ellipsoidal or paraboloidal surface of revolution. A front-surface light projection portion is located at a front end portion of this curved surface, and a lamp mounting portion is located at its rear end portion. The lamp mounting portion comprises a cylinder having a hollow structure and extends backward from the quadratic surface of revolution.

The dichroic film is formed on the inner surface of the curved surface of the reflector body and has an optical interference function of reflecting visible light rays and transmitting infrared rays.

The lamp comprises, for example, a halogen lamp. This lamp comprises a bulb made of quartz glass and a filament made of a tungsten coil arranged inside the bulb.

A sealing portion having a pinch seal structure is formed at one end portion of the bulb. Metal foils made of molybdenum are sealed on the pinch sealing portion. Inner and outer wells are respectively connected to these metal foils. The inner wells are connected to the filament stored in the bulb, and the outer wells are guided outside the bulb from the end portion of the sealing portion. The outer wells are then connected to terminal pins outside the sealing portion.

The lamp having the above structure is bonded to the reflector body by an adhesive. The adhesive can be a heat-resistant inorganic adhesive (inorganic cement) having a metal oxide such as alumina, silica, magnesia, or zirconia as a major constituent. This adhesive is filled between the outer surface of the lamp sealing portion of the curved surface and the inner surface of the lamp mounting portion while the sealing portion of the lamp is inserted into the hollow portion of the lamp mounting portion. Therefore, the adhesive can bond the lamp sealing portion to the lamp mounting portion of the mirror reflector.

By this bonding operation, the lamp is located inside the reflector body such that the center of light emitted from the filament is almost aligned with a focal position of the reflector.

In the lamp with a reflector having such a structure, when the terminal pins are electrically connected to a power source, a current flows through the filament, and light is emitted from the filament.

Light emitted from the filament passes through the bulb and reaches the dichroic film formed on the curved surface of the reflector body. Visible light of the light having reached the dichroic film is reflected by this film, and infrared rays having a wavelength of about 700 nm or more are transmitted through the dichroic film.

The visible light reflected by the dichroic film is projected forward from the light projection portion and illuminates objects such as articles. Light emitted from the lamp with the reflector contains only a small amount of heat, and temperatures of the objects such as articles are not increased, thereby preventing the objects from being adversely affected by heat.

When the filament emits light, it is heated. Heat from the filament is conducted to the sealing portion through the inner wells. The temperature of the sealing portion is increased. Infrared rays emitted from the filament cause an increase in temperature of the bulb wall. Heat from the bulb wall is conducted to the sealing portion to increase the temperature of the sealing portion.

When the dichroic film is formed o the reflecting surface as in the conventional lamp with a reflector, the infrared rays having passed through the dichroic film by the optical interference of the dichroic film reach the mirror reflector body to increase the temperature of the reflector body. Heat from the reflector body is conducted to the lamp mounting portion of the reflector. This heat is then conducted to the lamp sealing portion through the adhesive filled between the inner surface of the lamp mounting portion and the outer surface of the lamp sealing portion.

The temperature of the sealing portion is excessively increased to cause a thermal stress.

The following conventional method is used to bond the lamp to the reflector.

In the conventional method, the lamp is inserted into the reflector from the front opening of the reflector so that the sealing portion of the lamp passes the opening first, so that the sealing portion is inserted into the lamp mounting portion. The central axis of the lamp is aligned with the center line of the reflector, and at the same time the center of emission of the lamp is located at the focal point of the reflector. The reflector and the lamp are maintained in this state.

In this state, an operator holds an adhesive injection nozzle and inserts it into the lamp mounting portion from the front opening of the reflector. The adhesive i then injected from the injection nozzle and is filled in a space between the sealing portion of the lamp and the lamp mounting portion of the reflector.

In order to entirely fill the adhesive in the space between the sealing portion of the lamp and the lamp mounting portion of the reflector, the adhesive is injected at two positions in the space between the sealing portion and the lamp mounting portion.

When the adhesive injection operation is completed, the adhesive is dried and hardened.

In the conventional method described above, since the adhesive injection nozzle is held by the operator and is inserted into the space in the mounting portion through the front opening of the reflector, the adhesive may leak from the tip of the injection nozzle during its insertion, and this adhesive droplet may be attached to the reflecting surface.

In particular, when the adhesive is to be injected into the space between the sealing portion and the lamp mounting portion, the adhesive is filled twice, i.e., at two positions in the entire space. When the injection nozzle is pulled out from one position of this space and is then inserted into another position of the space, the adhesive tends to leak from the tip of the injection nozzle, and the resultant droplets may be attached to the reflecting surface.

When the adhesive is attached to the reflecting surface even in a very small amount, the reflecting surface is contaminated to degrade the reflecting performance. Therefore, the attached adhesive must be immediately removed from the reflecting surface.

Since a distance between the front opening and the lamp mounting portion is long to make it difficult to insert the adhesive injection nozzle and the distance between the sealing portion and the mounting portion of the lamp is small, the method of inserting the adhesive injection nozzle from the front opening of the reflector results in poor adhesive supply efficiency and disables automatic adhesive filling.

SUMMARY OF THE INVENTION

It is the first object of the present invention to provide a lamp device, which can minimize heat conduction to a lamp sealing portion through a lamp mounting portion of the reflector and prevent the lamp sealing portion from being overheated even if a temperature of a mirror reflector body is increased by an optical interference of a dichroic film.

It is the second object of the present invention to provide a method of bonding a mirror reflector to a lamp, which allows easy filling of an adhesive in a space between a sealing portion of a lamp and a lamp mounting portion of a mirror reflector, prevents the adhesive from being attached to an effective reflecting surface, and provides excellent workability.

In order to achieve the first objective of the present invention, there is provided a lamp device, comprising:

a mirror reflector including
- a reflector body having a reflector axis and a curved surface and a lamp mounting portion extending along a direction of the reflector axis at one end thereof, and the lamp mounting portion being constituted by a cylinder of a hollow structure open at an end corresponding to the curved surface and an end opposite thereto, and
- an interference film, formed on at least an inner surface of the curved surface of the reflector body;

a lamp including
- a bulb having a lamp axis and a sealing portion at an end of the lamp axis,
- electrode means arranged inside the bulb, and
- terminal means electrically connected to the electrode means and guided outside from the sealing portion;

an adhesive, filled in a space between an outer surface of the sealing portion and an inner surface of the lamp mounting portion while the sealing portion of the lamp is inserted in a hollow portion of the lamp mounting portion of the reflector body, for adhering the sealing portion to the lamp mounting portion; and a space region not filled with the adhesive, the space region being located inside the lamp mounting portion and surrounded by the inner surface of the lamp mounting portion, the outer surface of the sealing portion, and the adhesive filled therebetween, the space region being open on an end thereof corresponding to the curved surface, thereby preventing heat conduction between the lamp mounting portion and the sealing portion.

In order to achieve the second object of the present invention, there is provided a method of bonding a mirror reflector to a lamp with an adhesive in a lamp with a mirror reflector, comprising a mirror reflecting, including
- a reflector body having a reflector axis and a curved surface and a lamp mounting portion extending along a direction of the reflector axis at one end thereof, and the lamp mounting portion being constituted by a cylinder of a hollow structure open at an end corresponding to the curved surface and an end opposite thereto, and
- a light-reflecting surface formed on at least an inner surface of the curved surface of the reflector body;

a lamp including
- a bulb having a lamp axis and a sealing portion at an end of the lamp axis,
- electrode means arranged inside the bulb, and
- terminal means electrically connected to the electrode means and guided outside from the sealing portion; and an adhesive, filled in a space between an outer surface of the sealing portion and an inner surface of the lamp mounting portion while the sealing portion of the lamp is inserted in a hollow portion of the lamp mounting portion of the reflector body, for adhering the sealing portion to the lamp mounting portion, comprising the steps of:
- inserting the sealing portion of the lamp into the lamp mounting portion of the reflector body while an axis of the lamp is substantially aligned with an axis of the mirror reflector, and holding the mirror reflector and the lamp while assuring a space between the outer surface of the sealing portion and the inner surface of the lamp mounting portion; and
- injecting the adhesive from the opening of the lamp mounting portion at the end opposite to the curved surface toward the lamp mounting portion by using an adhesive injection tool, and filling the adhesive in the space between the outer surface of the sealing portion and the inner surface of the lamp mounting portion.

According to the lamp device according to the first object of the present invention, since the space region not filled with the adhesive is formed in a portion surrounded by the inner surface of the lamp mounting portion, the outer surface of the sealing portion of the bulb, and the adhesive filled therebetween, and the space region not filled with the adhesive is open at the end opposite to the curved surface of the reflector body, heat of the reflector body heated by infrared transmission through the interference film is conducted in a minimum amount to the sealing portion of the lamp through the lamp mounting portion. For this reason, the temperature rise of the lamp sealing portion can be suppressed.

According to the method of bonding the mirror reflector to the lamp according to the second object of the present invention, since the adhesive is injected by using the adhesive injection tool from the opening at the rear end portion of the lamp mounting portion into the lamp mounting portion, the adhesive is not dropped or attached to the reflecting surface of the mirror reflector. In addition, since the adhesive is injected through the opening at the rear end of the lamp mounting portion, the distance between this opening of the lamp mounting portion and the sealing portion is shortened, and it is easy to insert the nozzle, thus facilitating operations and improving adhesive injection efficiency.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
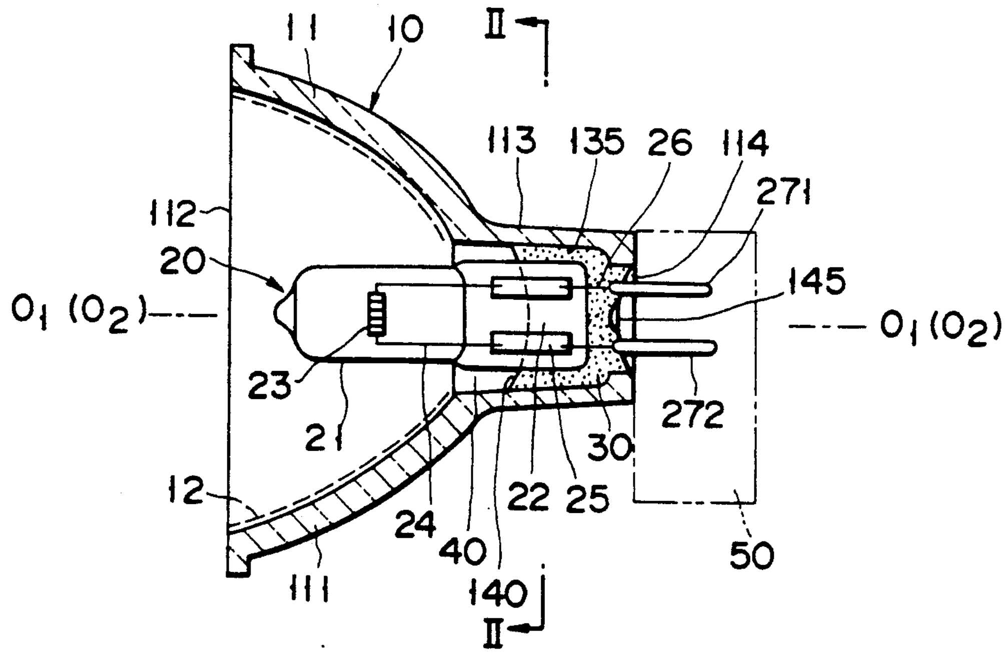
FIG. 1 is a sectional view showing a lamp device according to an embodiment of the present invention.
Figure 2:
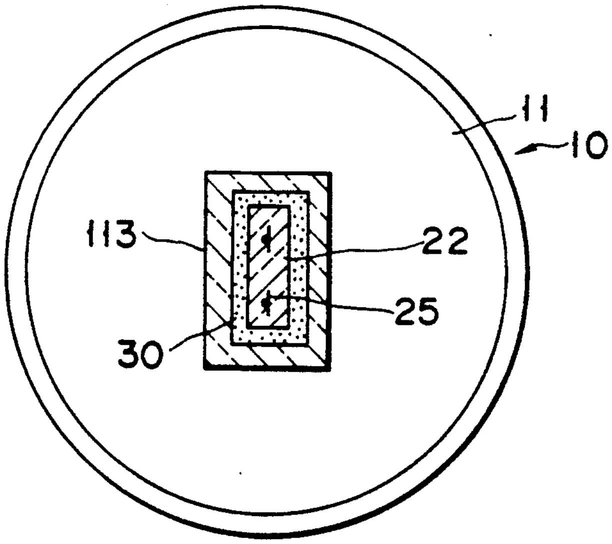
FIG. 2 is a sectional view of the lamp along the line II—II in FIG. 1.

Referring to FIG. 1, reference numeral 10 denotes a mirror reflector. The mirror reflector 10 comprises a reflector body 11 made of glass or a metal.

In this embodiment, the reflector body is made of glass. This reflector body 11 has a reflector axis 01—01 and comprises a curved surface 111 having the reflector axis 01—01 as its center of revolution. The curved surface 111 is part of an ellipsoidal surface of revolution.

A light projection portion 112 is open at one end portion, i.e., the front end portion of the quadratic surface 111 of revolution of the reflector body 11. A lamp mounting portion 113 extending along the direction of the reflector axis 01—01 is arranged at the other end portion, i.e., the rear end portion of the quadratic surface 111.

The lamp mounting portion 113 integrally extends backward from the curved surface 111. The lamp mounting portion 113 comprises a cylinder of a hollow structure. For example, the lamp mounting portion 113 has a rectangular parallelepiped hollow body.

The front and rear end portions of the lamp mounting portion 113 are open. A rear end opening 114 has a rectangular opening having an area smaller than the sectional area of the mounting portion 113.

A dichroic film 12 is formed on the inner surface of the curved surface 111 of the reflector body 11. Although the dichroic film 12 is known to those skilled in the art and is not illustrated in detail, the film 12 comprises a multilayered (17 to 21 layers) structure obtained by alternately stacking metal oxide films of a high refractive index such as $TiO_2$, $ZrO_2$, or ZnS, and metal oxide films of a low refractive index such as $SiO_2$ or $MgF_2$. The dichroic film 12 having the above structure has the nature for reflecting visible light and transmitting infrared rays. That is, the dichroic film 12 is a kind of an optical interference film.

A lamp 20 is mounted in the mirror reflector 10.

The lamp 20 comprises, for example, a halogen lamp, and comprises a bulb 21 made of quartz glass. The bulb 21 has a lamp axis 02—02 and a cylindrical shape along the lamp axis 02—02. The bulb 21 has a pinch sealing portion 22 at one end along the lamp axis 02—02.

An electrode means 23 is housed inside the bulb 21 and comprises a filament, e.g., made of a tungsten coil. Both ends of the filament 23 are connected to a pair of inner wells 24. These inner wells 24 are connected to a pair of metal foils 25 made of Mo bonded to the pinch sealing portion 22. A pair of outer wells 26 are connected to these metal foils 25, respectively. The pair of outer wells 26 are guided outside from the pinch sealing portion 22 and are respectively connected to a pair of terminal means 271 and 272. The terminal means 271 and 272 are terminal pins.

The halogen lamp 20 is bonded to the mirror reflector 10 through an adhesive 30.

The adhesive 30 is a heat-resistant inorganic adhesive containing a metal oxide such as $AlO_2$, $SiO_2$, MgO, or $ZrO_2$ as a major constituent and using water as a binder.

The adhesive 30 fills a space between the sealing portion 22 of the lamp 20 and the inner surface of the lamp mounting portion 113 of the mirror reflector 10 to fix the lamp 20 and the mirror reflector 10.

In this case, the lamp axis 02—02 is aligned with the reflector axis 01—01 of the mirror 10, or is located close thereto within an allowable error range. The center of emission of the lamp is aligned with the focal position of the mirror 10 or is located close thereto. In this position, the sealing portion 22 is inserted into the hollow portion of the lamp mounting portion 113 of the reflector body 11, and a space 135 is formed between the outer surface of the lamp sealing portion 22 and the inner surface of the lamp mounting portion 113. The adhesive 30 fills this space 135.

A space region 40 not filled with the adhesive 30 is formed inside the lamp mounting portion 113. The space region 40 is formed on the side of the ellipsoidal surface 111 within the lamp mounting portion 113 and is surrounded by the inner surface of the lamp mounting portion 113, the outer surface of the sealing portion 22 of the bulb, and the adhesive 30 filled therebetween. The front end of the space region 40 is open toward the light projection portion 112.

For this reason, the end portion of the lamp mounting portion 113 on the side of the curved surface 111 is spaced apart from the sealing portion 22 of the bulb through the space. For this reason, the space region 40 constitutes a heat-insulating space.

The adhesive 30 has a surface opposite to the space region 40, i.e., a front end face 140 as an inclined surface. This inclined surface 140 is located within the lamp mounting portion 113, and an inclined surface portion bonded to the lamp mounting portion 113 further extends forward than that bonded to the sealing portion 22.

A surface of the adhesive 30 at a position opposite to the other opening 114, i.e., a rear end face 145, is recessed inward.

The terminal pins 271 and 272 extending from the sealing portion 22 of the lamp 20 extend backward from the rear end face of the lamp mounting portion 113.

The terminal pins 271 and 272 are mechanically and electrically connected to a socket 50. The socket 50 has a receiving metal piece (not shown), and the terminal pins 271 and 272 are detachably locked on the receiving metal piece. This receiving metal piece is connected to the power source.

When the terminal pins 271 and 272 are inserted into the socket 50, the filament 23 is electrically connected to the power source through the receiving metal piece. At the same time, the lamp with the mirror reflector is supported on the socket 50.

An operation of the lamp with the mirror reflector having the above structure will be described below.

When the terminal pins 271 and 272 are connected to the power source, a current flows through the filament 23, and the filament 23 emits light.

Light emitted from the filament 23 passes through the bulb 21 and reaches the dichroic film 12 formed on the curved surface 111 of the reflector body 11. The dichroic film 12 reflects visible light components of the incident light and transmits infrared components having a wavelength of about 700 nm or more therethrough.

The visible light reflected by the dichroic film 12 is projected forward from the optical projection portion 112 of the reflector body 11 and illuminates an object such as an article. Since the light emitted from the lamp with the reflector has only a small amount of heat, and the temperature of the object such as an article is not increased and the object is not adversely affected by heat.

When the filament 23 emits light, the filament 23 is heated, and the heat is conducted from the filament 23 to the sealing portion 22 through the inner wells 24. The temperature of the sealing portion 22 is increased. The infrared rays emitted from the filament 23 cause an increase in temperature of the bulb wall. Heat is conducted through the bulb wall to the sealing portion 22 so that the temperature of the sealing portion 22 is increased.

In addition, since the dichroic film 12 is formed on the reflecting surface in the lamp with the reflector, infrared rays are transmitted through the dichroic film 12 due to its optical interference. The infrared rays transmitted through the dichroic film 12 reach the reflector body 11 and heat the reflector body 11. The heat of the reflector body 11 is conducted to the lamp mounting portion 113 formed integrally therewith, thereby heating the lamp mounting portion 113. Heat of the lamp mounting portion 113 is conducted to the sealing portion 22 of the lamp through the adhesive 30.

According to the present invention, the space region 40 not filled with the adhesive 30 is formed inside the lamp mounting portion 113, and this space region 40 constitutes a heat-insulating space. Therefore, conduction of heat of the lamp mounting portion 113 to the sealing portion 22 of the lamp is minimized.

More specifically, a portion of the reflector body 11 having the highest temperature is a portion closest to the filament 23 of the lamp. Heat of this high-temperature portion is conducted to the lamp mounting portion 113. An end portion, i.e., the front end portion of the lamp mounting portion 113 close to the curved surface 111 has the highest temperature.

To the contrary, since the space region 40 is formed near the end of the lamp mounting portion 113 close to the curved surface 111, the high-temperature portion of the lamp mounting portion 113 is heat-insulated from the sealing portion 22 of the bulb through the space region 40. Therefore, conduction of heat of the lamp mounting portion 113 to the sealing portion 22 of the lamp is minimized.

This allows suppression of a temperature rise of the sealing portion 22 and prevention of a thermal stress of the sealing portion 22.

When a halogen lamp is used as the lamp 20, a large amount of heat is emitted from the lamp, and the reflector body 11 is rapidly heated. Therefore, a formation effect of the space region 40 can be effectively enhanced.

Since the inwardly recessed portion 145 is formed on a surface of the adhesive 30 opposite to the opening 114, i.e., the rear surface, when the lamp 20 is mounted in the socket 50, a space is formed between the adhesive 30 and the socket 50 through the recessed portion 145, and conduction of heat of the lamp 20 to the socket 50 is minimized. For this reason, damage to the socket 50 due to heat can be prevented.

A method of bonding the mirror reflector 10 to the lamp 20 will be described below.

The first embodiment of the bonding method will be described with reference to FIGS. 3 to 6.

The reflector 10 having the above structure is supported by a reflector chuck 60, and at the same time, the lamp 20 having the above structure is supported by a lamp chuck 70.

Figure 3:
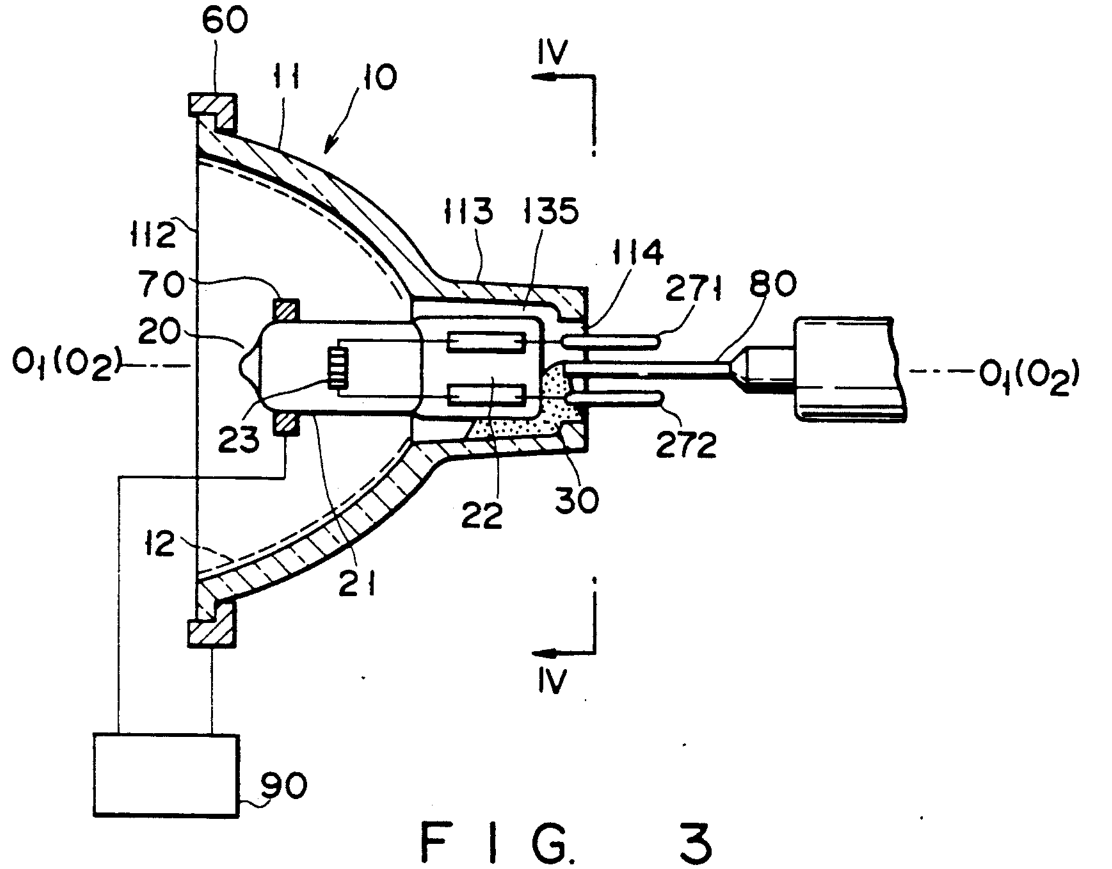
FIG. 3 is a sectional view showing the step of injecting an adhesive to a half level so as to explain the first embodiment of a method of bonding the mirror reflector to the lamp.

The reflector 10 is supported by the mirror chuck 60 such that the mirror axis 01—01 is substantially horizontal, as shown in FIG. 3. The lamp 20 is supported by the lamp chuck 70 such that the bulb axis 02—02 is substantially horizontal. The lamp 20 is housed in the reflector 10, and the sealing portion 22 of the lamp 20 is inserted into the lamp mounting portion 113 of the reflector 10. In this state, the reflector 10 and the lamp 20 are respectively supported by the reflector chuck 60 and the lamp chuck 70 such that the bulb axis 02—02 is almost aligned with the mirror axis 01—01.

Figure 4:
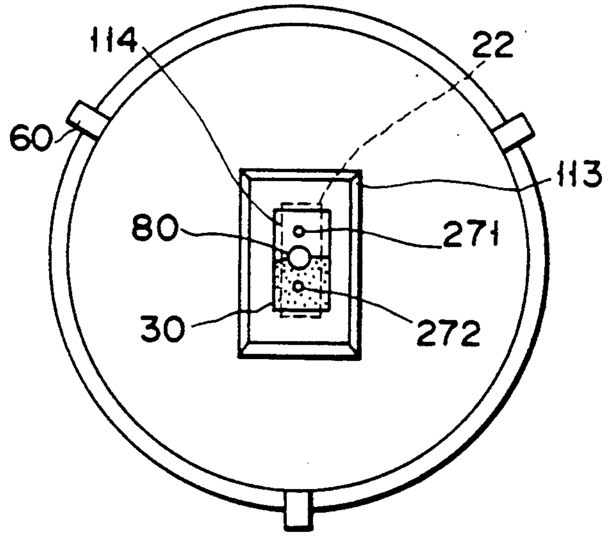
FIG. 4 is a sectional view of the lamp along the line IV—IV of FIG. 3.
Figure 5:
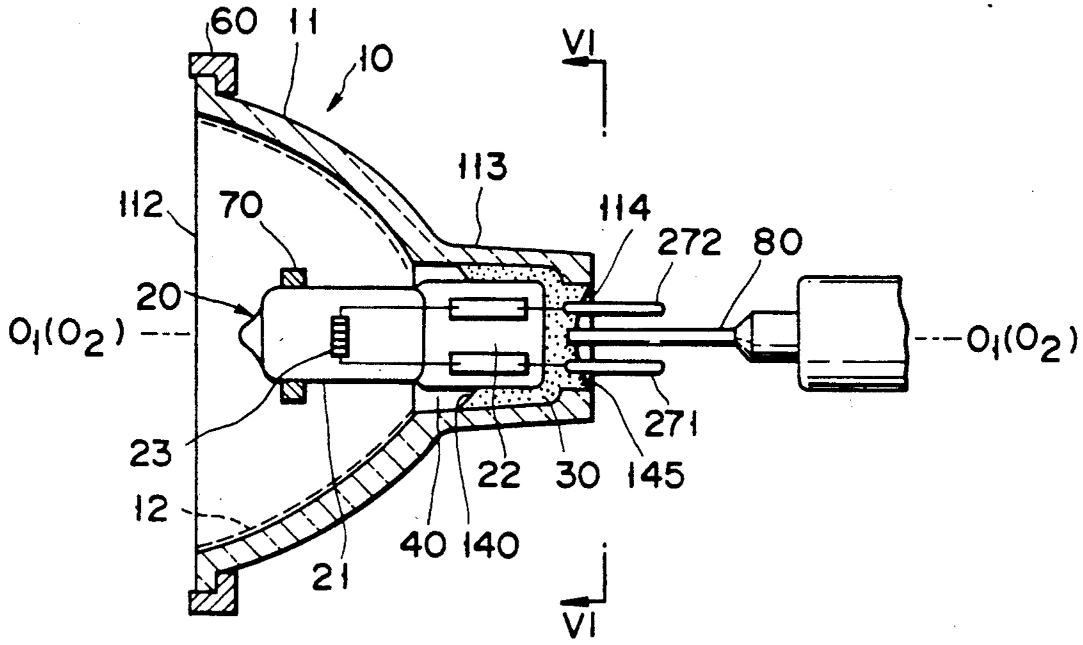
FIG. 5 is a sectional view showing the step of fully injecting the adhesive.
Figure 6:
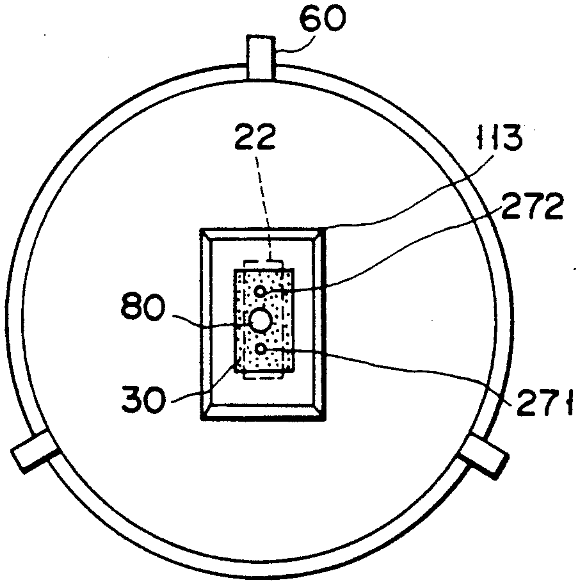
FIG. 6 is a sectional view of the lamp along the line VI—VI of FIG. 5.

In this state of the reflector 10 and the lamp 20, as shown in FIG. 4, the long sides of the lamp mounting portion 113 are vertically aligned since its sectional shape is a rectangular shape, and the longitudinal direction of the pinch sealing portion 22 of the lamp 20 is aligned in the vertical direction since the portion 22 is flat. The pair of terminal pins extending from the sealing portion 22 are supported such that one terminal pin 271 is located at an upper position, and the other terminal pin 272 is located at a lower position.

In this state, the reflector 10 and the lamp 20 are respectively horizontally supported when the reflector chuck 60 and the lamp chuck 70 are adjusted so that the center of emission of the lamp 20 is located at the focal position of the reflector 10 or has a predetermined positional relationship with the focal position. That is, the focusing relationship between the lamp 20 and the reflector 10 is adjusted.

An adhesive injection tool, e.g., a nozzle 80 is then inserted from the rear end opening 114 of the lamp mounting portion 113 of the reflector 10. The nozzle 80 is connected to an adhesive supply unit through a hose (not shown), and the adhesive 30 is injected from the tip of the nozzle 80.

The tip of the nozzle 80 is inserted into the lamp mounting portion 113 through the rear end opening 114 and is aligned with the reflector axis 01—01. That is, the tip of the nozzle 80 is located between the pair of vertically aligned terminal pins 271 and 272.

In this state, the heat-resistant inorganic adhesive 30 is injected from the nozzle 80. At this time, the adhesive 30 has a viscosity of about 32,000 to 42,000 cps/25° C. When the adhesive 30 is injected as described above, the adhesive 30 injected from the nozzle 80, abuts against the sealing portion 22 of the lamp 20 and fills in the lower portion of the space 135 between the sealing portion 22 and the mounting portion 113.

When the adhesive 30 is supplied in an amount about half the required filling amount, the mirror reflector 10 and the lamp 20 are reversed about the reflector axis 01—01 while their positional relationship is kept maintained, the nozzle 80 is kept inserted and the adhesive 30 is in a fluid state.

This pivotal movement is performed by pivoting the reflector chuck 60 and the lamp chuck 70 by a drive unit 90.

The reflector chuck 60 and the lamp chuck 70 are rotated together through 180°. Upon this pivotal movement, as is apparent from FIG. 6, the positions of the pair of terminal pins 271 and 272 are reversed.

In this state, the remaining amount of the adhesive 30 is injected from the nozzle 80.

The adhesive 30 injected from the nozzle 80 abuts against the end face of the sealing portion 22, and fills the lower portion of the space 135 between the sealing portion 22 and the mounting portion 113.

The upper space portion is filled with the previously filled adhesive 30, and the lower space portion is then filled with the subsequently filled adhesive 30. The adhesive 30 thus fills the entire space between the sealing portion 22 of the lamp 20 and the lamp mounting portion 113 of the reflector 10.

When the adhesive 30 is injected from the nozzle 80 as described above, the adhesive 30 is pulled by the gravitational force so that the inclined surface is formed on the front end face 140 of the adhesive 30. At the same time, the recessed potion 145 having a central recess is formed on the rear end face.

When filling of a predetermined amount of the adhesive 30 is completed, the nozzle 80 is left inserted for a short period of time. After the adhesive 30 remaining in the distal end portion of the nozzle 80 is completely discharged to prevent formation of a droplet, the nozzle 80 is removed.

When the injection operation is completed, warm air is supplied from the front light projection portion 112 of the reflector 10 and the rear end opening 114 of the mounting portion 113 to the mounting portion 113. This warm air is generated by a heater and a blower (neither are shown).

Since warm air is blown to the front and rear end faces 140 and 145 of the adhesive 30, the adhesive 30 is forcibly dried.

The adhesive 30 is immediately hardened by this drying to bond the mirror reflector 10 to the lamp 20.

According to the adhesive filling method described above, since the adhesive injection nozzle 80 is inserted from the rear end opening 114 of the lamp mounting portion 113 of the reflector body 11, there is no change of adhesive 30 becoming attached to the reflecting surface 12 made of a dichroic film. Contamination of the reflecting surface 12 with the adhesive can be prevented. Therefore, the adhesive need not be wiped out from the reflecting surface 12, and degradation of the reflecting characteristics of the reflecting surface can be prevented.

Since the nozzle 80 is inserted from the rear end opening 114 of the lamp mounting portion 113, the opening 114 is open wide, and the nozzle 80 can be easily inserted. The opening area of the injection port is kept large, and a predetermined amount of adhesive can be injected within a short period of time. At the same time, since a distance between the rear end opening 114 and the space 135 between the sealing portion 22 and the lamp mounting portion 113 is short, the adhesive injected from the nozzle 80 can be easily injected into the space 135, thereby shortening the injection time.

When the adhesive 30 is to be filled by the nozzle 80, the positions of the reflector 10 and the lamp 20 are reversed. Therefore, the adhesive fills the entire space 135, and the nozzle 80 need not be shifted to another position for injection. In this manner, since the positions of the reflector 10 and the lamp 20 need only be reversed, an automatic injection operation can be performed.

Moreover, when a filling amount of the adhesive injected from the nozzle 80 is selected to be an optimal amount, the space region 40 can be easily formed. In addition, since the adhesive injected from the nozzle 80 flows by the gravitational force, the inclined surface can be formed as the front end face 140 of the adhesive, and the recessed portion 145 having the central recess can be formed as the rear end face.

The second embodiment of a method of bonding a mirror reflector 10 to a lamp 20 will be described with reference to FIGS. 7 to 10.

The bonding method of the second embodiment is substantially the same as that of the first embodiment except that the directions of the mirror reflector 10 and the lamp 20 and a method of inserting a nozzle 180 are different from those of the first embodiment.

Figure 7:
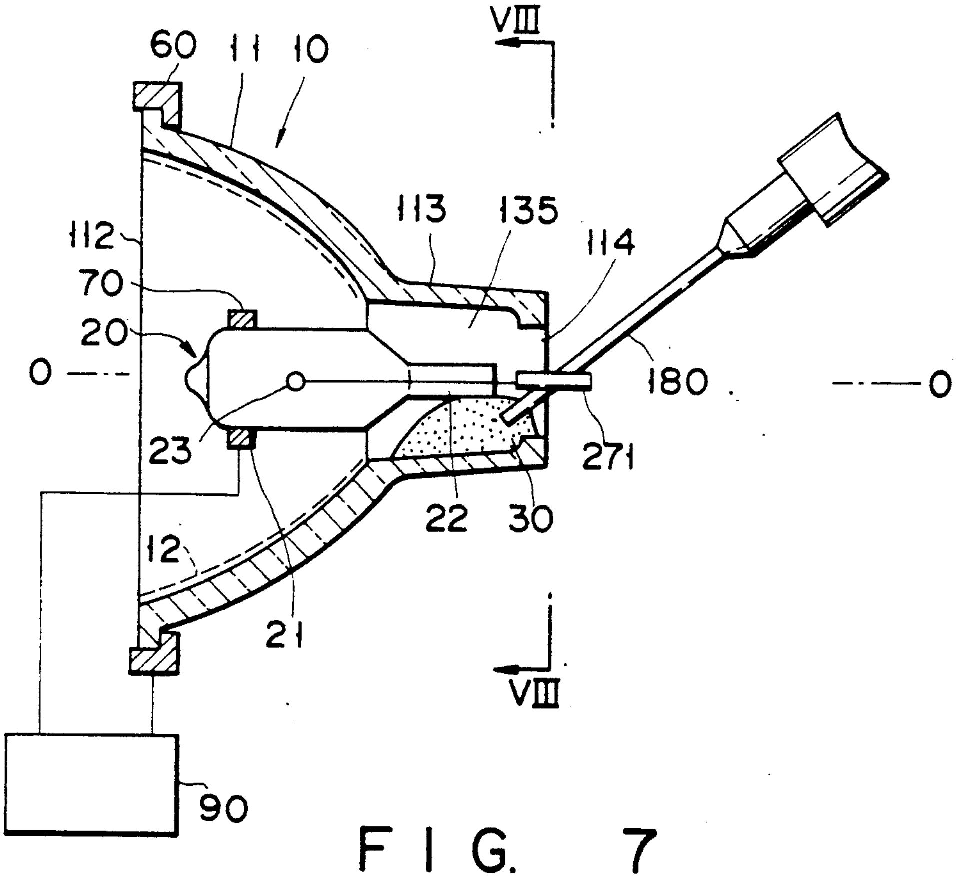
FIG. 7 is a sectional view showing the step of injecting an adhesive to a half level so as to explain the second embodiment of a method of bonding the mirror reflector to the lamp.

In the second embodiment, the mirror reflector 10 is horizontally held by a reflector chuck 60, and the lamp 20 is horizontally held by a lamp chuck 70, as shown in FIG. 7. The lamp 20 is housed in the reflector 10, and a sealing portion 22 of the lamp 20 is inserted into a lamp mounting portion 11 of the reflector 10. In this state, the reflector chuck 60 and the lamp chuck 70 support the reflector 10 and the lamp 20 such that a bulb axis 02—02 is almost aligned with a reflector axis 01—01.

Figure 8:
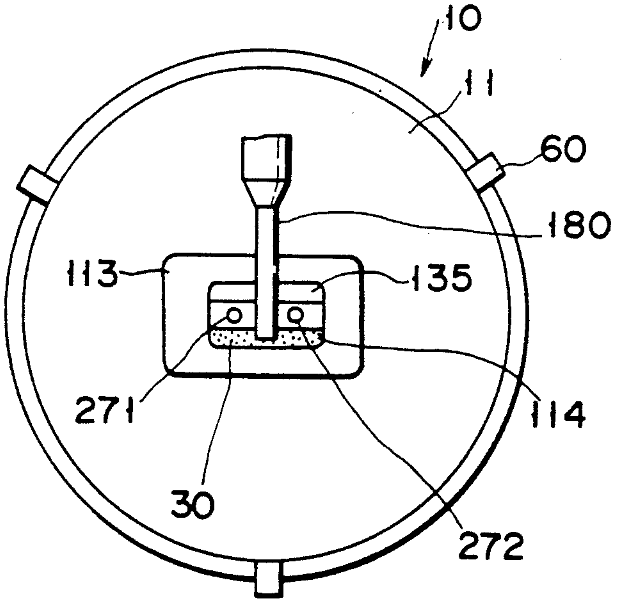
FIG. 8 is a sectional view of the lamp along the line VIII—VIII of FIG. 7.
Figure 9:
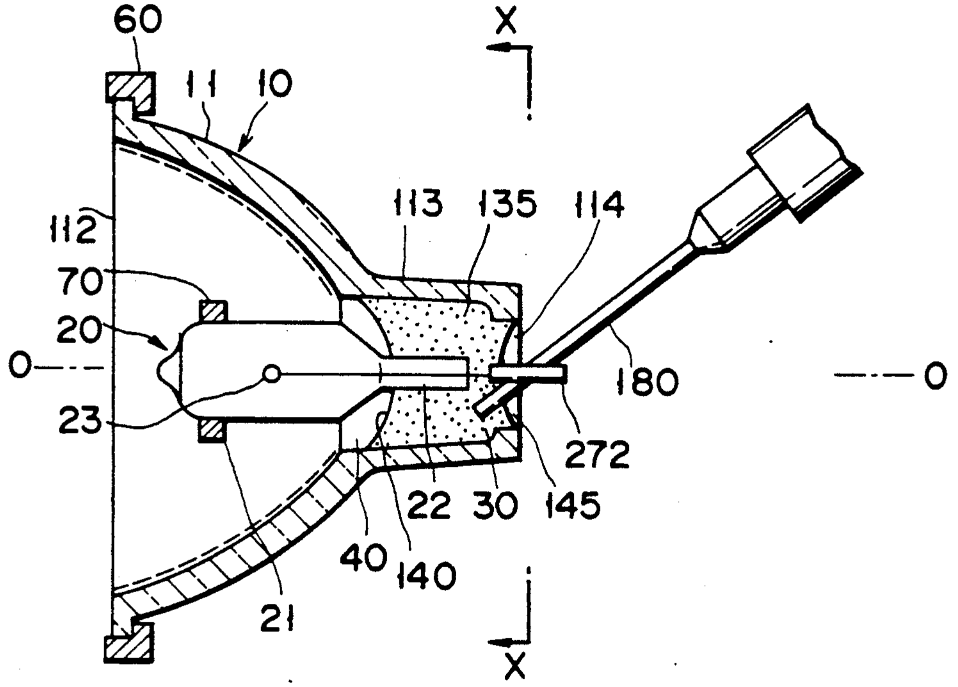
FIG. 9 is a sectional view showing the step of fully injecting the adhesive.
Figure 10:
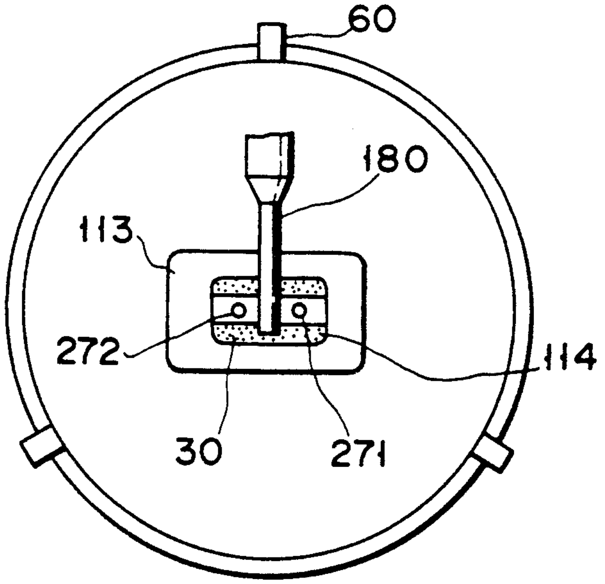
FIG. 10 is a sectional view of the lamp along the line X—X of FIG. 9.

In this case, as shown in FIG. 8, the positional relationship between the reflector 10 and the lamp 20 is given such that a pair of terminal pins 271 and 272 extending from the sealing portion 22 are located at the left and right positions and oppose each other in the horizontal direction.

The focal adjustment of the lamp 20 and the reflector 10 will be performed in this state.

An adhesive injection nozzle 180 is inserted from a rear end opening 114 of the lamp mounting portion 113. The tip of the nozzle 180 is inserted from the rear end opening 114 from the obliquely upward direction to the obliquely downward direction and is located between the pair of terminal pins 271 and 272 opposite to each other in the right-and-left direction.

In this state, a heat-resistant inorganic adhesive 30 is injected from the nozzle 180. When the adhesive 30 is injected in an amount about half a total injection amount, the nozzle 180 is removed.

The vertical positions (right and left) of the reflector 10 and the lamp 20 are reversed about the reflector axis 01—01 while the positional relationship between the reflector 10 and the lamp 20 is kept maintained. By this reversing operation, as is apparent from FIGS. 9 and 10, the left and right positions of the pair of terminal pins 271 and 272 are reversed.

In this state, the nozzle 180 is inserted from the rear end opening 114, and the remaining amount of the adhesive 30 is injected.

The space 135 between the sealing portion 22 of the lamp 20 and the lamp mounting portion 113 is entirely filled with the previously filled adhesive 30 and the subsequently injected adhesive 30.

When filling of the adhesive 30 is completed, the nozzle 180 is removed, and warm air is supplied from a front light projection portion 112 of the reflector 10 and the rear end opening 114 of the mounting portion 113 to dry the adhesive 30.

The reflector 10 is then integrally bonded to the lamp 20 with the adhesive 30.

The third embodiment of a method of bonding a mirror reflector 10 to a lamp 20 will now be described with reference to FIGS. 11 to 13.

The bonding method of the third embodiment is identical to that of the first embodiment, except that the position relation between the reflector 10 and the lamp 20 is focus-adjusted, and the reflector 10 and the lamp 20 are preliminarily bonded to each other.

Figure 11:
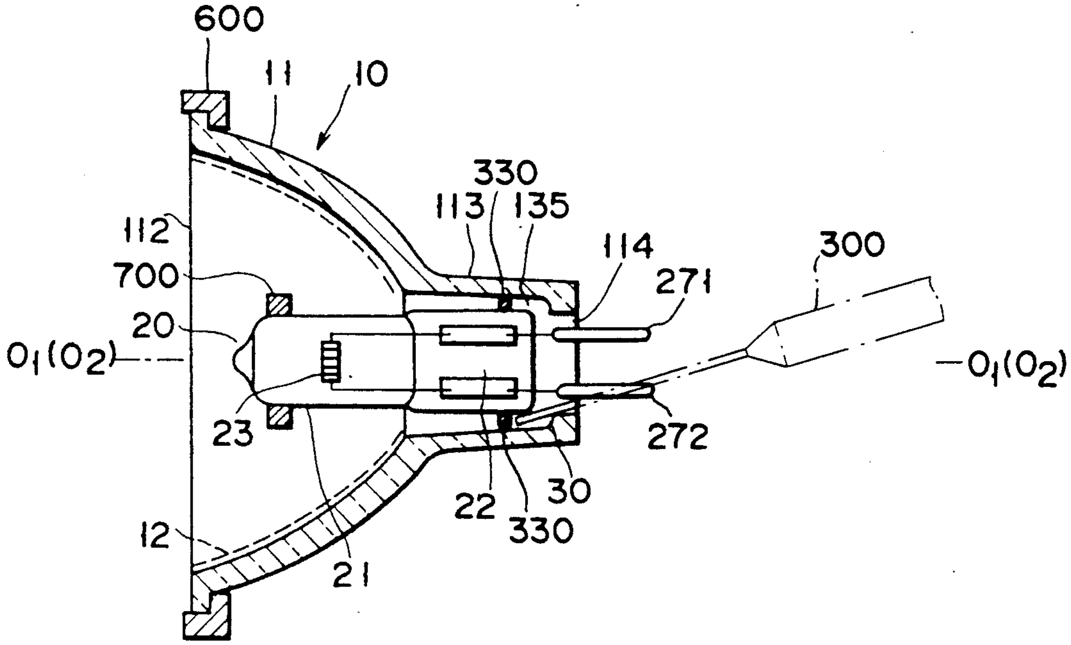
FIG. 11 is a sectional view showing a lamp and a mirror reflector preliminarily bonded to each other by means of a preliminary-bonding adhesive, and explaining the third embodiment of a method of bonding the mirror reflector to the lamp.

More specifically, to bond the mirror reflector 10 and the lamp 20 together, the mirror reflector 10 and the lamp 20 are held by a mirror chuck 600 and a lamp chuck 700, respectively, as is illustrated in FIG. 11. The chucks 600 and 700 are positioned such that the lamp axis 02—02 is substantially aligned with the reflector axis 01—01. Further, either the mirror chuck 600 or the lamp chuck 700, or both are slightly moved, thereby placing the light-emission center of the lamp 20 at the focal point of the mirror reflector 10 or at a specific position with respect to the focal point of the mirror reflector 10. In other words, the mirror reflector 10 and the lamp 20 are focus-adjusted.

Then, a preliminary-bonding nozzle 300 is inserted into the lamp mounting portion 113 of the mirror reflector 10 through the rear end opening 114 of the portion 113. A preliminary-bonding adhesive 330 is supplied from the nozzle 300 into the gap between the lamp mounting portion 113 and the sealing portion 22 of the lamp 20.

The preliminary-bonding adhesive 330 is, for example, an organic adhesive which hardens when irradiated with ultraviolet (UV) rays. It is desirable that the adhesive 330 be one which is combusted and decomposed into carbon dioxide when heated to 200° C. or more. To preliminarily bond the mirror reflector 10 and the lamp 20 together, it suffices to apply the adhesive 330 in a small amount, for example, 0.2 to 0.5 cc, and to apply the adhesive at two or three positions in the gap between the lamp mounting portion 113 and the sealing portion 22.

Thereafter, UV rays are applied through an optical fiber or the like onto the adhesive 300 preliminarily bonding the mirror reflector 10 to the lamp 20. The intensity of these UV rays is 100 to 200 mmW, and the rays are applied for 1 to 3 seconds. As result of this, the adhesive 330 quickly hardens. Hence, the mirror reflector 10 and the lamp 20, both focus-adjusted, are preliminarily bonded to each other.

The focus adjustment, described above, can be performed after the adhesive 330 is applied, but before the adhesive hardened.

Next, the mirror reflector 10 is firmly bonded to the lamp 20 by means of the same adhesive 30 as is used in the first and second embodiments. More precisely, as is shown in FIG. 12, the mirror reflector 10 is held by the mirror chuck 600. The lamp 20 need not be held by the lamp chuck 700. This is because the lamp 20 is already integral with the mirror reflector 10, and once the reflector 10 is held by the chuck 600, the lamp 20 is also held in place.

Figure 12:
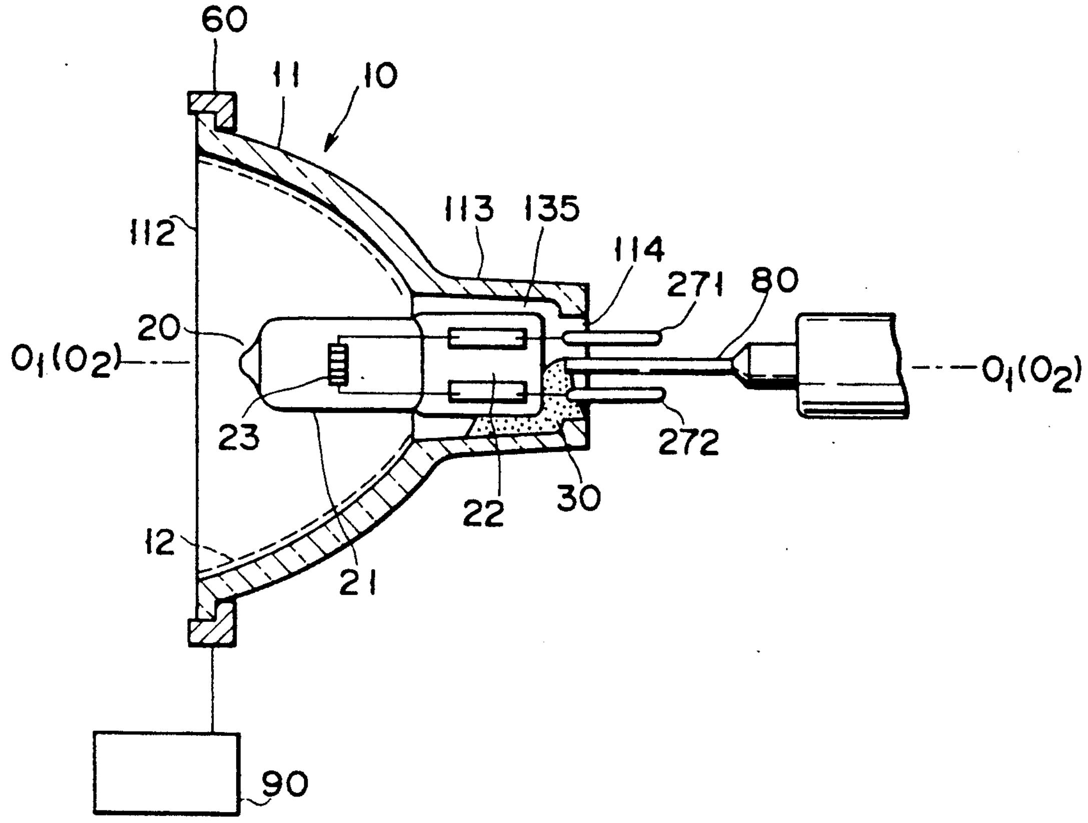
FIG. 12 is a sectional view showing the step of injecting an adhesive to half level the gap between the lamp and the mirror reflector.

Then, as is shown in FIG. 12, a nozzle 80 is inserted into the gap between the lamp mounting portion 113 and the sealing portion 22. This done, the adhesive 30 is applied into the gap from the nozzle 80, in about half the amount that should be filled in the gap. Then, a driver 90 is operated, thereby rotating the mirror chuck 600 through 180° around the reflector axis 01—01 of the mirror reflector 10, with the nozzle 80 kept inserted in the space 135 between the lamp mounting portion 113 and the sealing portion 22. As a result, the mirror reflector 10 and the lamp 20 are also rotated through 180°.

Figure 13:
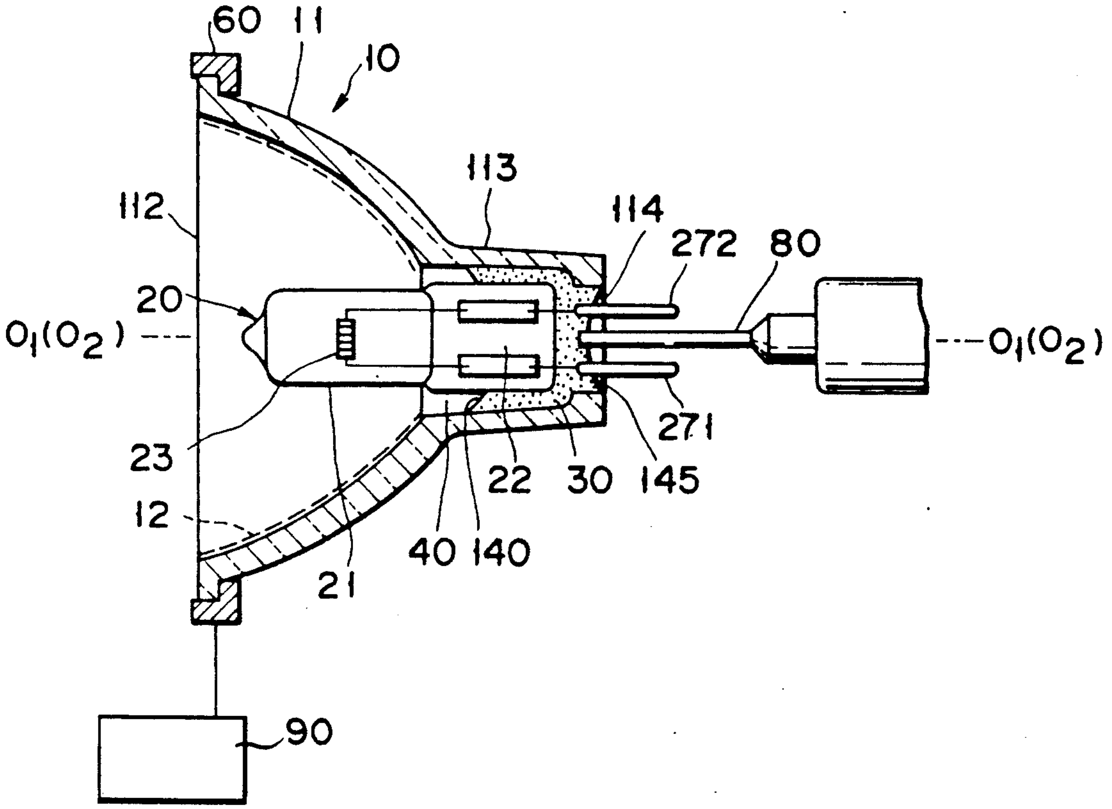
FIG. 13 is a sectional view showing the step of full injecting the adhesive filling up the gap between the lamp and mirror reflector.

Thereafter, as is illustrated in FIG. 13, the remaining half of the adhesive 30 is applied from the nozzle 80 into the gap 135 between the lamp mounting portion 113 and the sealing portion 22. Eventually, this adhesive 30 fills the upper half of the space 135 between the sealing portion 22 and the lamp mounting portion 113, whereas the previously applied adhesive 30 fills the lower half of the space 135. Hence, the entire space 135 is filled with the adhesive 30.

The unit consisting of the mirror reflector 10 and the lamp 20 now integral with the reflector 10 is removed from the mirror chuck 600. This unit is put into a heating/drying furnace (not shown). In the furnace, the unit is heated to 200° C. or more, preferably about 300° C. for 5 to 10 minutes. The adhesive 30 is, therefore, dried and hardened. As the unit is heated to 200° C. or more, the adhesive 330, used for the provisional bonding of the reflector 10 and the lamp 20 and contained in the adhesive 30, is combusted and decomposed into carbon dioxide. The carbon dioxide is mostly expelled from the adhesive 30 which is hardening, but some carbon dioxide remains within the adhesive 30, in the form of pores. These pores are not so large as to impair the bonding force of the adhesive 30.

As the adhesive 30 dries and hardens in the heating/drying furnace, the mirror reflector 10 is bonded firmly to the lamp 20.

As has been described, in the method of the third embodiment, the mirror reflector 10 and the lamp 20 are held by the chucks 600 and 700, respectively, and are thereby focus-adjusted. However, once the reflector 10 and the lamp 20 are bonded preliminary, they need not be held by jigs to be set in a desired position relationship while the adhesive 30 is being applied into the space 135 or drying and hardening in the furnace. In this respect, the method of the third embodiment is advantageous over those of the first and second embodiments, wherein the reflector 10 and the lamp 20 must be held by the mirror chuck 60 and the lamp chuck 70, respectively, up until the adhesive 30 hardens completely.

Also, the method of the third embodiment is advantageous in that it suffices to hold either the mirror reflector 10 or the lamp 20 while the adhesive 30 is drying and hardening in the heating/drying furnace.

It should be noted that the adhesive 330, which is used to bond the reflector 10 and the lamp 20 preliminarily, is not limited to an UV-hardening, organic adhesive. Rather, the adhesive 330 can be an instantaneously hardening one, or can be one identical to the adhesive 30 used for firmly bonding the mirror reflector 10 to the lamp 20.

Further, the adhesive 30 applied in the space 135 can first be dried by blowing hot air onto the lamp mounting portion 113, before the mirror reflector 10 and the lamp 20, provisionally bonded together, are placed in the heating/drying furnace, and then be hardened completely.

In the case where the adhesive 30 is dried and hardened in the heating/drying furnace, the adhesive 30 filled in the lamp mounting portion 113 should better be dried preliminarily before the mirror reflector 10 is brought into the heating/drying furnace. This preliminary drying is accomplished by applying hot air onto the front light-projecting portion 112 of the reflector 10 and simultaneously introducing the hot air into the lamp mounting portion 113 thereof through the rear end opening 114 of the portion 113. Hence, only the surface of the adhesive mass 30, i.e., only the front and rear faces 140 and 145, is dried and hardened. The preliminary drying prevents the adhesive 30 from flowing down when and after the unit consisting of the reflector 10 and the lamp 10, bonded together, is moved into the heating/drying furnace.

In each embodiment described above, the adhesive 30 is injected from the rear end opening 114 of the lamp mounting portion 113 into the lamp mounting portion 113 by using the nozzle 80 or 180 while the mirror reflector 10 and the lamp 20 are kept supported horizontally. However, the mirror reflector 10 and the lamp 20 may be vertically supported or may be inclined.

In each embodiment described above, the mirror reflector 10 and the lamp 20 are horizontally supported, and are intermittently reversed through 180° . However, the mirror reflector 10 and the lamp 20 may be continuously rotated, or intermittently rotated every 60° or 90° .

As can be understood from the second bonding method shown in FIGS. 7 to 10, the nozzle 180 need not be located on the reflector axis 01—01.

The composition, viscosity, and hardening rate of the adhesive, and various characteristics such as the injection nozzle diameter, discharge pressure, and the like may be selected in consideration of an automatic injection operation of the adhesive and leakage to a portion except for the predetermined portion, and an optimal adhesive is selected in accordance with application purposes and practical applications.

The first and second bonding methods are not limited to a mirror reflector having a dichroic film on its reflecting surface, but are applicable to a reflecting surface made of an aluminum film.

The lamp 20 is not limited to a halogen lamp, but may be replaced with an incandescent lamp, a wedge base type lamp, or a discharge lamp.

In a lamp with a mirror reflector according to the present invention, as has been described above, a space region not filled with an adhesive is surrounded by the inner surface of a lamp mounting portion, the outer surface of a sealing portion of the bulb, and the adhesive filled therebetween. The space region not filled with the adhesive minimizes conduction of heat of the heated reflector body during an ON operation of the lamp to the sealing portion of the lamp, thereby suppressing the temperature rise of the lamp sealing portion.

According to the method of bonding the mirror reflector to the lamp of the present invention, since the adhesive is injected from the rear end opening of the lamp mounting portion to the lamp mounting portion by using an adhesive injection tool, the adhesive is not dropped or attached to the reflecting surface of the reflector. Since the adhesive is injected through the rear end opening of the lamp mounting portion, the distance between the opening of the lamp mounting portion and the sealing portion can be reduced. Therefore, the adhesive injection tool can be easily inserted, workability can be facilitated, and injection efficiency of the adhesive can be improved.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. A method of bonding a mirror reflector to a lamp wherein:

the mirror reflector includes:

a reflector body having a reflector central axis, a curved surface, and a lamp mounting portion extending backward from a recessed portion of the curved surface along the reflector central axis, said lamp mounting portion having a cylinder shape of hollow structure with an opening at a rear and a front of the lamp mounting position, and a light-reflecting surface formed on at least an inner surface of said reflector body;

the lamp includes:

a bulb having a lamp central axis and a sealing portion at a rear end of the lamp along the lamp central axis;

electrodes located inside said bulb;. and a pair of terminals extending outward from a rear end portion of said sealing portion electrically connected to the electrode means;

the method comprising the steps of:

aligning the lamp with the mirror reflector so that the lamp central axis aligns with the reflector central axis;

inserting the sealing portion into the lamp mounting portion of the reflector body such that a space is formed between an outer surface of the sealing portion and an inner surface of the lamp mounting portion;

holding the mirror reflector and the lamp so that the lamp central axis line and the reflector central axis line are almost parallel with each other;

inserting an adhesive injection tool into an injection port at the rear end opening of the lamp mounting portion of the reflector body; and rotating the mirror reflector and lamp while injecting adhesive into the space between the outer surface of the sealing portion and the inner surface of the lamp mounting portion to fill the space between the outer surface of the sealing portion and the inner surface of the lamp mounting portion and to adhere said sealing portion to said lamp mounting portion.

2. A method of bonding a mirror reflector to a lamp, according to claim 1, wherein the step of rotating the mirror reflector and lamp comprises the step of rotating the mirror reflector and lamp continuously while injecting adhesive through the injection port.

3. A method of bonding a mirror reflector to a lamp according to claim 1 further comprising the step of:

drying the adhesive after the adhesive has been injected into the space between the outer surface of said sealing portion and inner surface of said lamp mounting portion.

4. A method of bonding a mirror reflector to a lamp wherein:

the mirror reflector includes:

a reflector body having a reflector central axis, a curved surface, and a lamp mounting portion extending backward from a recessed portion of the curved surface along the reflector central axis, said lamp mounting portion having a cylinder shape of hollow structure with an opening at a rear and a front of the lamp mounting portion, and the lamp includes:

a bulb having a lamp central axis and a sealing portion at a rear end of the lamp along the lamp central axis;

electrodes located inside said bulb; and a pair of terminals extending outward from a rear end portion of said sealing portion electrically connected to the electrode means;

the method comprises the steps of:

aligning the lamp with the mirror reflector to substantially align a lamp axis with a mirror central axis;

inserting the sealing portion into the lamp mounting portion of a mirror reflector body such that a space is formed between an outer surface of the sealing portion and an inner surface of the lamp mounting portion;

holding said mirror reflector and said lamp so that the lamp central axis line and the reflector central axis line are almost parallel with each other;

obliquely inserting an adhesive injection tool into an injection port at the rear end opening of the lamp mounting portion;

injecting a first predetermined amount of adhesive from the injection tool into the space between the outer surface of the sealing portion and the inner surface of said lamp mounting portion;

rotating said mirror and said lamp together around said reflector central axis by 180°; and injecting a second predetermined amount of adhesive from the injection tool into the space between the outer surface of the sealing portion and the inner surface of said lamp mounting portion to fill the space between said outer surface of said sealing portion and said inner surface of said lamp mounting portion and to adhere said sealing portion to said lamp mounting portion.

5. A method of bonding a mirror reflector to a lamp according to claim 4 further comprising the step of:

drying the adhesive after the adhesive has been injected into the space between the outer surface of said sealing portion and inner surface of said lamp mounting portion.

* * * * *